(12) United States Patent
Phillipps

(10) Patent No.: US 6,337,914 B1
(45) Date of Patent: Jan. 8, 2002

(54) TELESCOPIC TRANSDUCER MOUNTS

(76) Inventor: John Quentin Phillipps, 30 Mount Avenue, Ealing, London, W5 2QJ (GB)

( * ) Notice: Subject to any disclaimer, the term of this patent is extended or adjusted under 35 U.S.C. 154(b) by 0 days.

(21) Appl. No.: 09/033,170

(22) Filed: Mar. 2, 1998

(30) Foreign Application Priority Data

Feb. 28, 1997 (GB) .............................................. 9704173

(51) Int. Cl.⁷ .............................. H04R 1/02; H04B 1/38
(52) U.S. Cl. ........................ 381/87; 455/556; 379/433
(58) Field of Search ........................... 381/87, 333, 334, 381/361, 367, 374, 376, 379, 301, 306; 455/556, 575, 90, 550, 95, 97, 128, 129, 347, 351; 379/433; 343/702

(56) References Cited

U.S. PATENT DOCUMENTS

| | | | |
|---|---|---|---|
| 5,189,632 A | * 2/1993 | Paajanen | 379/110 |
| 5,197,091 A | * 3/1993 | Takagi et al. | 379/58 |
| 5,414,444 A | 5/1995 | Britz | |
| 5,467,324 A | 11/1995 | Houlihan | |
| 5,481,616 A | * 1/1996 | Freadman | 381/90 |
| 5,555,449 A | * 9/1996 | Kim | 455/89 |
| 5,584,054 A | 12/1996 | Tyneski et al. | |
| 5,625,673 A | * 4/1997 | Grewe et al. | 379/61 |
| 5,742,697 A | * 4/1998 | Ching-Chung | 381/169 |
| 5,943,627 A | * 8/1999 | Kim et al. | 455/569 |
| 5,970,418 A | * 10/1999 | Budd et al. | 455/550 |
| 5,983,073 A | * 11/1999 | Ditizik | 455/11.1 |
| 5,999,822 A | * 12/1999 | Wicks et al. | 455/550 |

FOREIGN PATENT DOCUMENTS

JP        08162820       6/1996

* cited by examiner

Primary Examiner—Forester W. Isen
Assistant Examiner—Laura A. Grier
(74) Attorney, Agent, or Firm—McDermott, Will & Emery

(57) ABSTRACT

A portable electronic apparatus such as a personal digital assistant (PDA) with a telescopic transducer mount on which is mounted a microphone and an earphone, the positions of which are adjustable relative to one another to enable use of the apparatus in a number of different modes, with optimal positioning of the PDA display, microphone and earphone in relation to the user's eyes, ears and mouth.

10 Claims, 7 Drawing Sheets

TELESCOPIC TRANSDUCER MOUNTS

This invention relates to a telescopic transducer mount, which has particular but not exclusive application as an extendible earphone and microphone for portable electronic equipment.

The recent expansion in the availability of different types of portable electronic devices is well known. These include laptop and hand held portable computers, the latter sometimes known as electronic organizers or personal digital assistants. Mobile telephones are also well known and these are increasingly being integrated with small portable computers to form a convenient hand held multifunctional unit, for example as in the Nokia 9000 Communicator, which combines a personal digital assistant with a mobile telephone.

The inherent problem with devices in which the user needs to interact with the display while also using an earphone and/or microphone, is that the display needs to be positioned at a comfortable viewing distance, while any microphone should optimally be near the user's mouth, and any speaker or earphone near the user's ear. The comfortable viewing distance can depend on what is comfortable for an individual as well as on the use of the apparatus, for example if it is to be hand-held at a comfortable focusing distance for reading a display screen, or if, in the case of a laptop for example, the apparatus is generally used at arm's length while the user is typing.

The present invention provides portable electronic apparatus comprising display means and a telescopic transducer mount comprising a plurality of sections, wherein the mount includes an audio transducer and is operable such that the position of the transducer is adjustable relative to the display means. The display means may be a liquid crystal display within a body which includes processing means for running programs.

The transducer may be a microphone or an earphone which may be adjusted to be close to the user's mouth or ear respectively, enabling a user to provide voice input to, or to listen to sound output from, for example, a multi-media program, while continuing to view the display generated by the program.

Such an apparatus may provide a second audio transducer mounted to the same mount, wherein the first transducer is a microphone and the second transducer is an earphone. The positions of the microphone and earphone are adjustable relative to one another and relative to the display means. This addresses the problem of the user's eye, ear and mouth operating at different distances from a portable electronic device.

The location of the earphone and the microphone on the same telescopic mount and adjustable in position relative to one another enables the mount, earphone and microphone to be arranged in a number of positions, so that the apparatus can function in a number of different modes.

A further advantage is that the distance between the microphone and the earphone can be adjusted for optimal performance according to the needs of each user.

The invention further provides that the telescopic mount may be conveniently folded into a recess in the body of the portable electronic apparatus. This avoids the inconvenience related to solutions which provide for a headset linked by a flexible wire to the apparatus.

In another aspect, the invention provides telescopic transducer mount apparatus comprising an audio transducer and means for releasably connecting the mount to an electronic apparatus, wherein the mount is operable such that the position of the transducer is adjustable relative to the connecting means.

The provision of a mount separate from the apparatus enables existing electronic apparatus to benefit from the invention by connecting the mount to the apparatus via a standard interface and providing suitable software to operate with the microphone and earphone located on the mount.

The invention further provides that the microphone and earphone may be located on separate telescopic mounts, allowing each transducer to be adjusted independently of the other.

Embodiments of the invention will now be described by way of example with reference to the accompanying drawings, in which.

Figure 1:
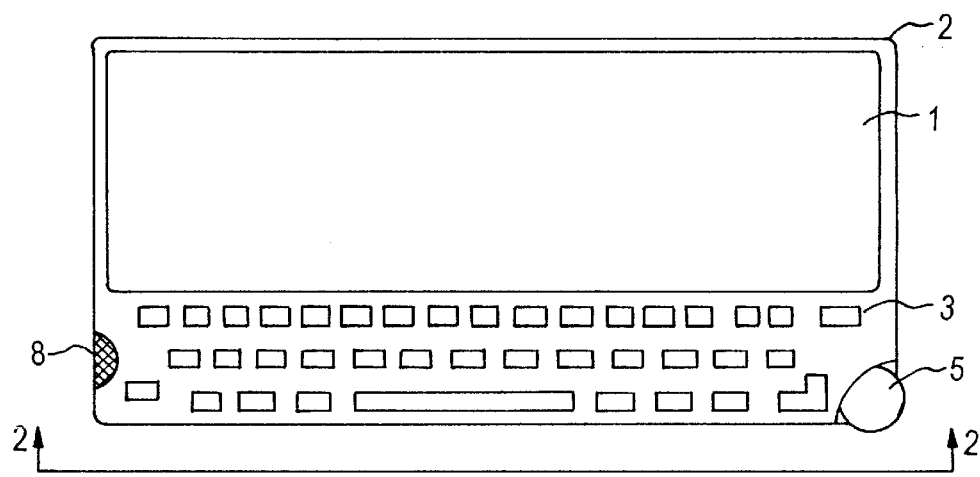
FIG. 1 is a plan view of a personal digital assistant (PDA) combining the functions of personal computer and mobile telephone.

Referring to FIGS. 1 to 5, a first embodiment of the invention comprises a display 1 mounted in a body 2 with user input means 3. The display 1 may be a flat panel liquid crystal display as is used in many types of hand-held computer. The body contains microcomputer circuitry, memory and a battery power pack as would be found in hand-held computers such as the Psion 3-series personal organiser. It also contains circuitry enabling the unit to be used as a mobile telephone. The user input means 3 is, for example, a keyboard. Standard connectors, such as Centronics or RS-232 types, may also be provided in the body 2 to enable connection to a printer and other external peripherals. A PCMCIA slot may also be provided in the body 2 to enable PCMCIA cards to be used, for example to allow connection to external disk drives, additional memory or any of the other large range of currently available PCMCIA peripherals.

The telescopic mount 4 (shown in FIG. 2) is connected to the body via a connecting means 5, for example a universal joint. The mount 4 comprises a number of sections 4a–n and includes an earphone 6 at the end of the final section 4n of the mount furthest from the universal joint 5. It further includes a microphone 7 mounted near the top of the section 4(n-1) of the mount immediately before the final section 4n. A microphone 8 is provided to the body 2 of the PDA when the PDA is to be used as a mobile telephone.

Figure 2:
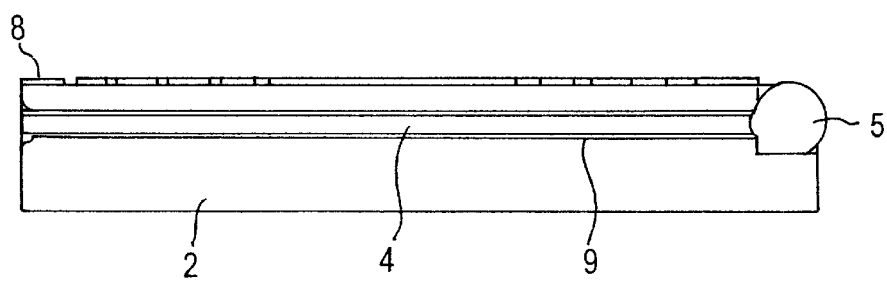
FIG. 2 is a side view of the PDA along the line A–A', showing the telescopic mount folded away into a recess in the body of the PDA.

Referring to FIG. 2, when the telescopic mount 4 is not in use, it may be conveniently folded away in recess 9 in the body 2 of the PDA.

Figure 3:
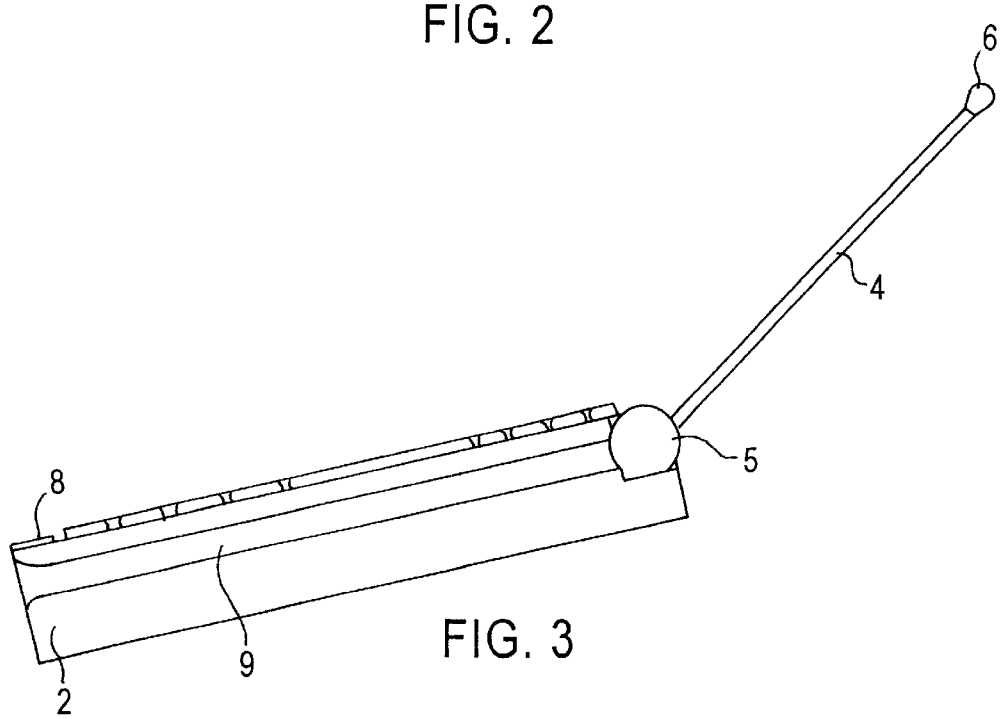
FIG. 3 is a side view as in FIG. 2, showing the position of the telescopic mount when the PDA is used as a mobile telephone.
Figure 4:
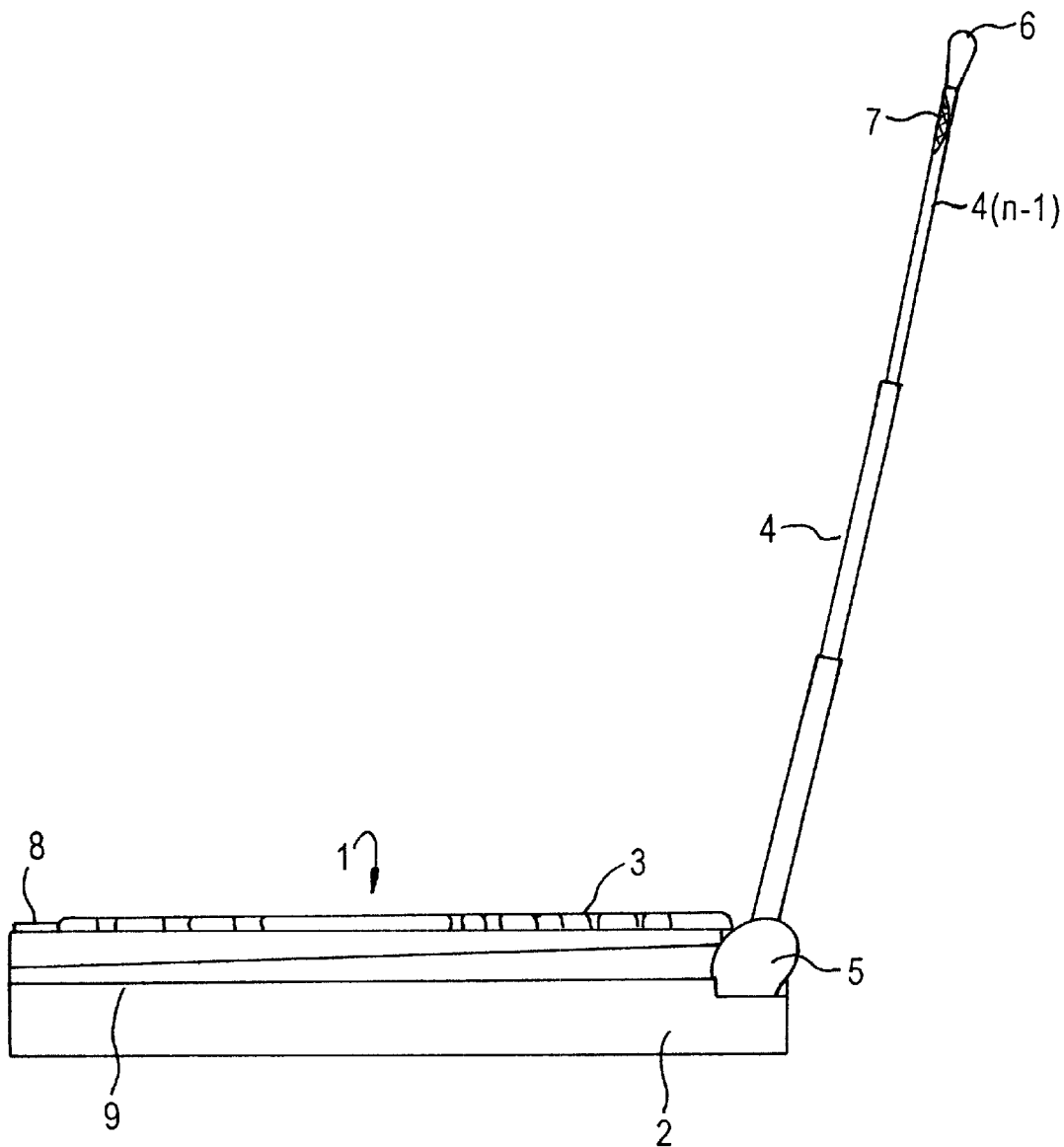
FIG. 4 is a side view as in FIG. 2, showing the position of the telescopic mount when the PDA is being used for dictation.
Figure 5:
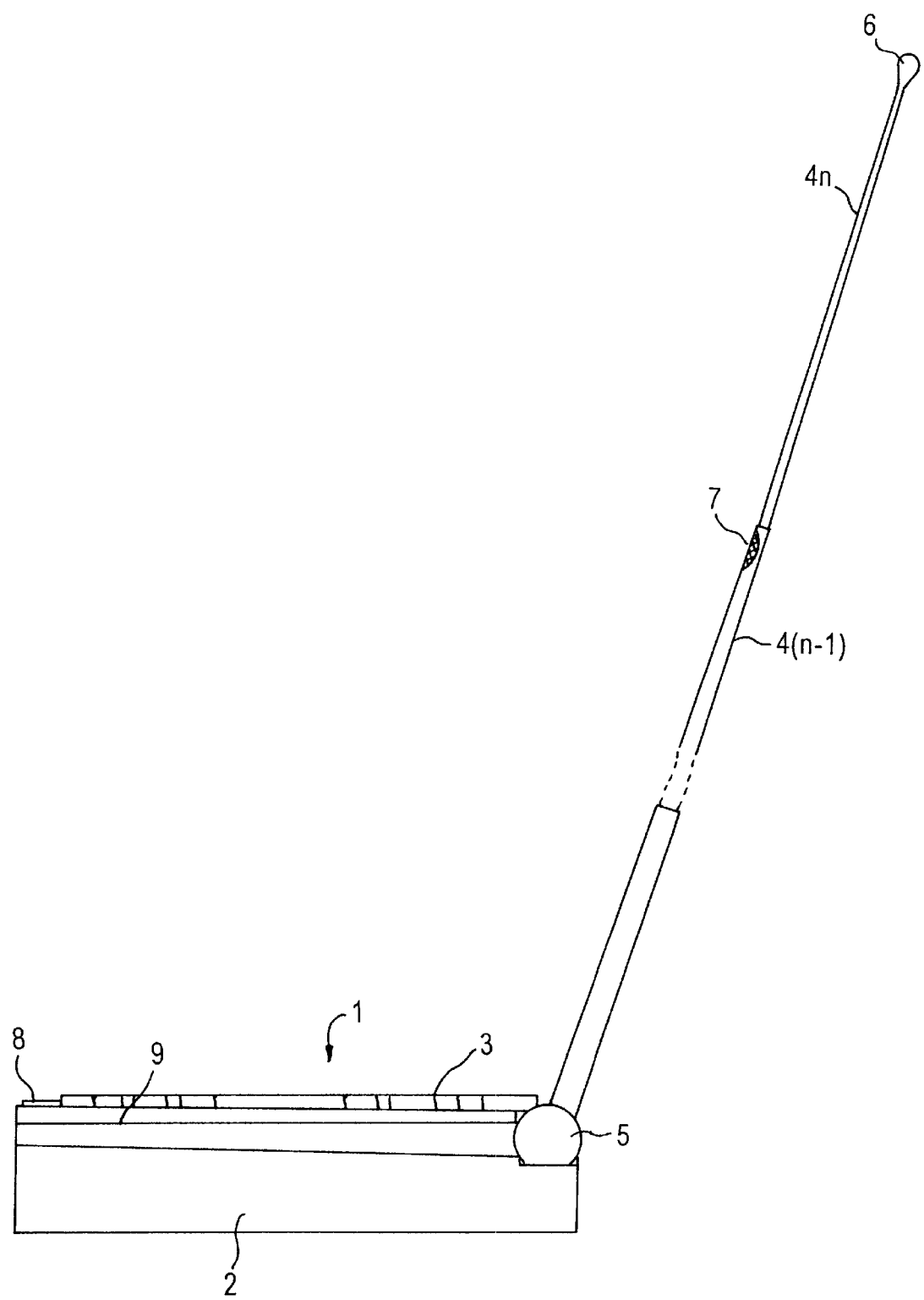
FIG. 5 is a side view of the PDA as in FIG. 2, showing the position of the telescopic mount when extended for use of both the microphone and earphone.

FIGS. 3 to 5 illustrate the various modes in which the PDA may be used.

Referring to FIG. 3, when the PDA is to be used as a mobile telephone, the telescopic mount is in its fully retracted position and is arranged so that the user speaks into the microphone 8 on the body 2, while the earphone 6 at the end of the telescopic mount is adjusted so as to be close to the user's ear.

Referring to FIG. 4, when voice input such as dictation to the PDA is required, the mount 4 is extended until the microphone 7 is close to the user's mouth, which may for example be between 6 inches and 3 feet away from the body of the PDA, whilst the user may continue to view the display 1. For example, in a word processor mode, the software running in the PDA may directly convert voice input into the microphone 7 into corresponding text on the display 1. In this mode, the earphone 6 is not used.

It is envisaged that, with suitable voice recognition technology, the microphone 7 may be used as at least one of the user input means 3, thus largely obviating the need for a keyboard. This may have the added advantage of enabling the display area to be increased for a given device size. Other user input means may also be used instead of a keyboard to increase the available display area, including keys of the 'trackerball' type, or a virtual touchscreen keyboard.

Referring to FIG. 5, in this mode, the mount is intended for use of both earphone 6 and microphone 7, with the mount 4 being moved relative to the display 1 and extended until the microphone 7 is close to the user's mouth. The top section 4n of the telescopic mount is also extended until the earphone 6 is close to the user's ear. With the mount in this position, the user may continue to view the display 1. This mode of operation is particularly suitable where the display 1 includes a miniature video camera and associated circuitry, so that the apparatus may be used as a videophone. In this configuration, the mount may be adjusted so that the microphone 7 is, for example, between 6 41 and 3' away from the body of the videophone, depending on the distance which makes for comfortable viewing by the user.

With appropriate software, the PDA may also be configured to read out, via the earphone 6, text appearing in the display 1, or to play sounds associated with the images being displayed.

Figure 6:
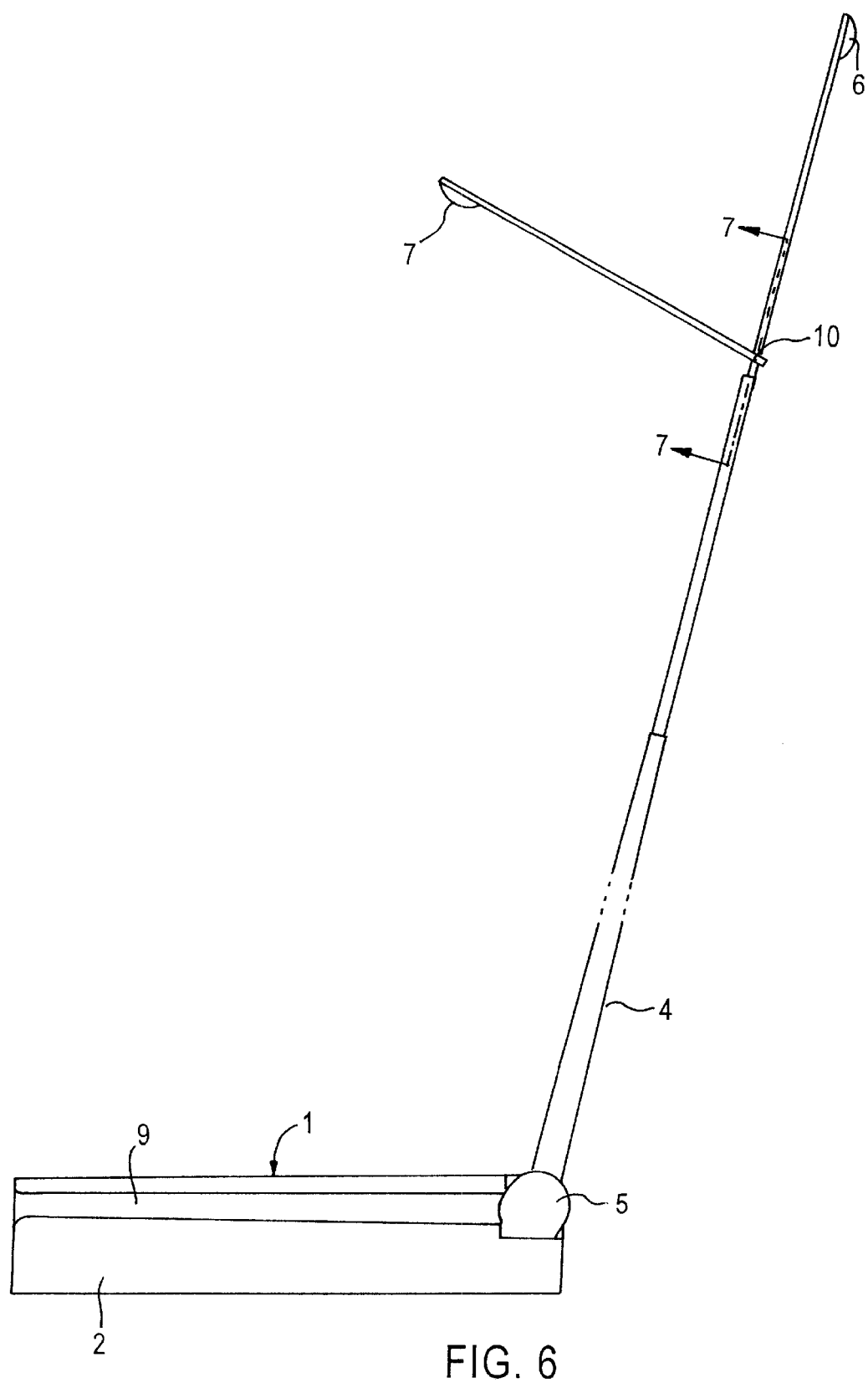
FIG. 6 shows a second embodiment of the invention, in which the microphone and earphone are connected by a friction hinge.

Referring to FIG. 6, in a second embodiment of the invention, the mount is extended and the position of the microphone 7 relative to the earphone 6 is adjusted by means of a friction hinge 10 connecting the sections bearing the microphone and earphone.

Figure 7:
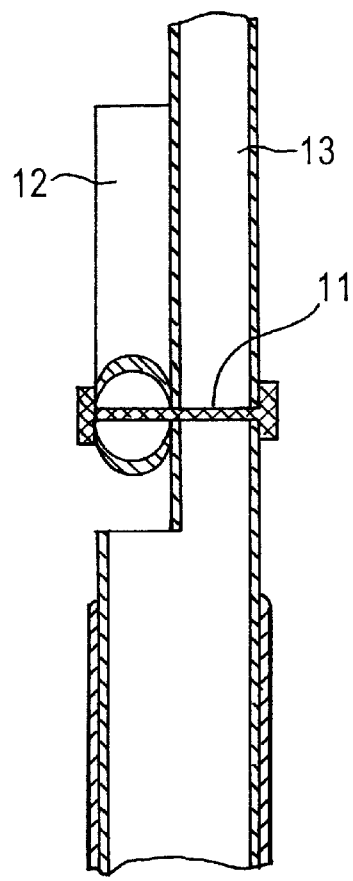
FIG. 7 shows a cross-section through the friction hinge along the line B–B' in FIG. 6.

Referring to FIG. 7, the hinge 10 comprises a pin 11 which binds the two parts 12, 13 of the section 4n tightly together so that the friction of the parts rubbing together is sufficient to keep each part in position. Alternatively, a relatively thin ring of a suitable material such as a rubber may be placed between the parts 12, 13 in the region of the pin 11, to enhance the friction effect.

Figure 8:
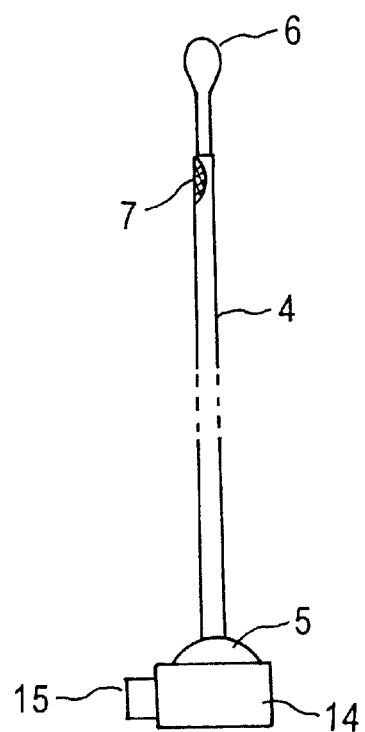
FIG. 8 shows a third embodiment of the invention, showing the mount separately from the portable electronic apparatus to which it is to be connected.

Referring to FIG. 8, a third embodiment of the invention comprises a telescopic mount 4 on a universal joint 5 located in an enclosure 14 which includes a connector 15, such as an edge connector, for releasably connecting the mount to a portable electronic apparatus, for example through an existing port on the apparatus or via a PCMCIA socket.

The enclosure 14 may be free standing, with a cable connection between the connector 15 and the connector of the electronic apparatus. This allows the mount to be used as an add-on peripheral for both portable and non-portable electronic apparatus, for example a standard PC.

Figure 9:
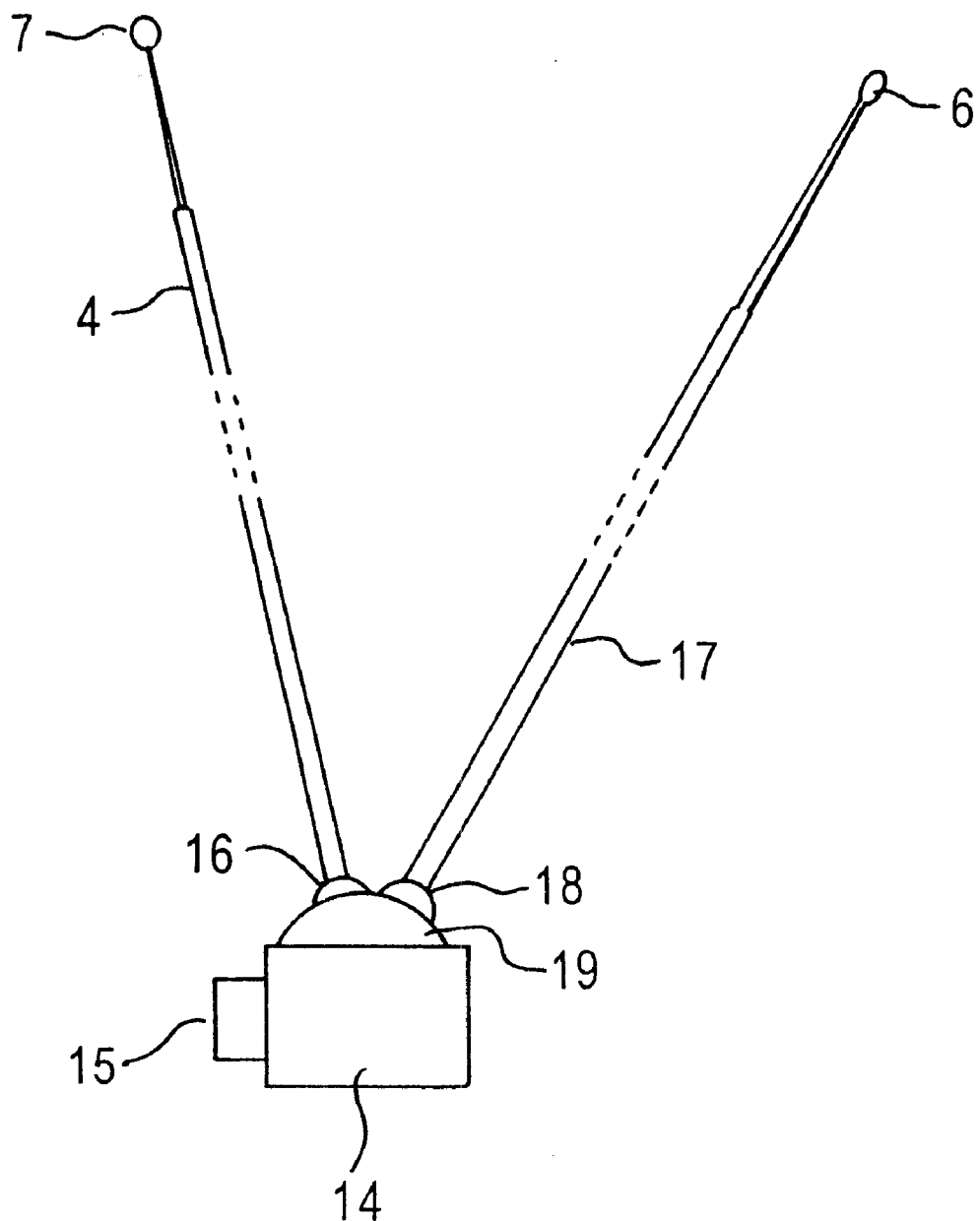
FIG. 9 shows a fourth embodiment of the invention, showing the provision of the microphone and earphone on two separate mounts.

Referring to FIG. 9, a fourth embodiment of the invention comprises a first telescopic mount 4 on a universal joint 16 and a second telescopic mount 17 on a universal joint 18, both mounted to a universal joint 19. The enclosure 14 and connector 15 are as described in relation to the third embodiment. The earphone 6 is located on mount 17, while the microphone 7 is located on mount 4, allowing the microphone and earphone to be adjusted independently of one another.

In all of the above embodiments, connections between the earphone 6 and microphone 7 and the circuitry in the body 2 may be made by conducting leads running within the telescopic mount and through the universal joint 5, or by suitable metallic conductors formed inside and along the length of the mount itself, where the mount is formed from a non-conducting material such as a plastic.

Where a lead is used to make the necessary connection, the lead may easily become tangled or jammed. To avoid this, the lead may be sprung, so that as the mount is extended, the lead extends with it, and as the mount is retracted, the spring automatically retracts the lead.

A reel device which is suitable for this purpose is described in U.S. Pat. No. 5,339,461. An alternative reel device is shown in FIGS. 10 and 11.

Figure 10:
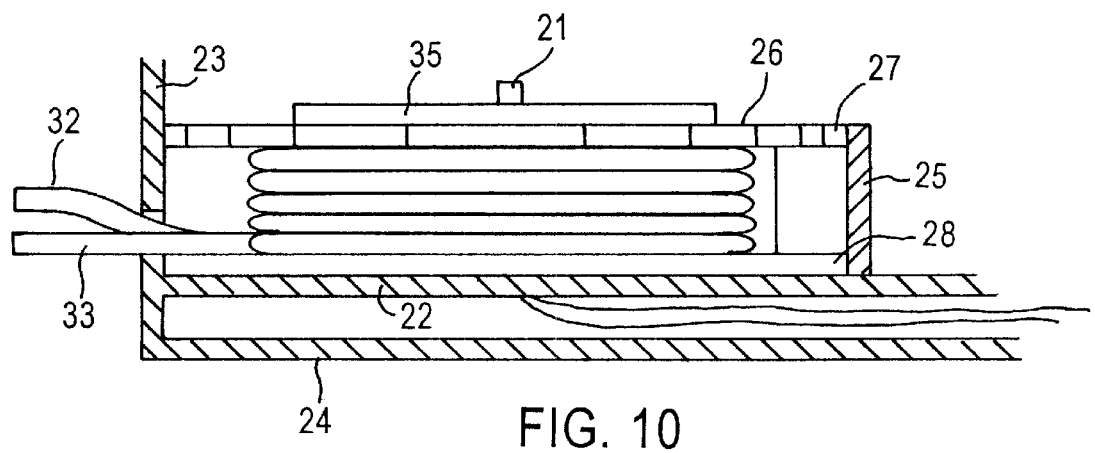
FIG. 10 is a cross-sectional view of a reel device.
Figure 11:
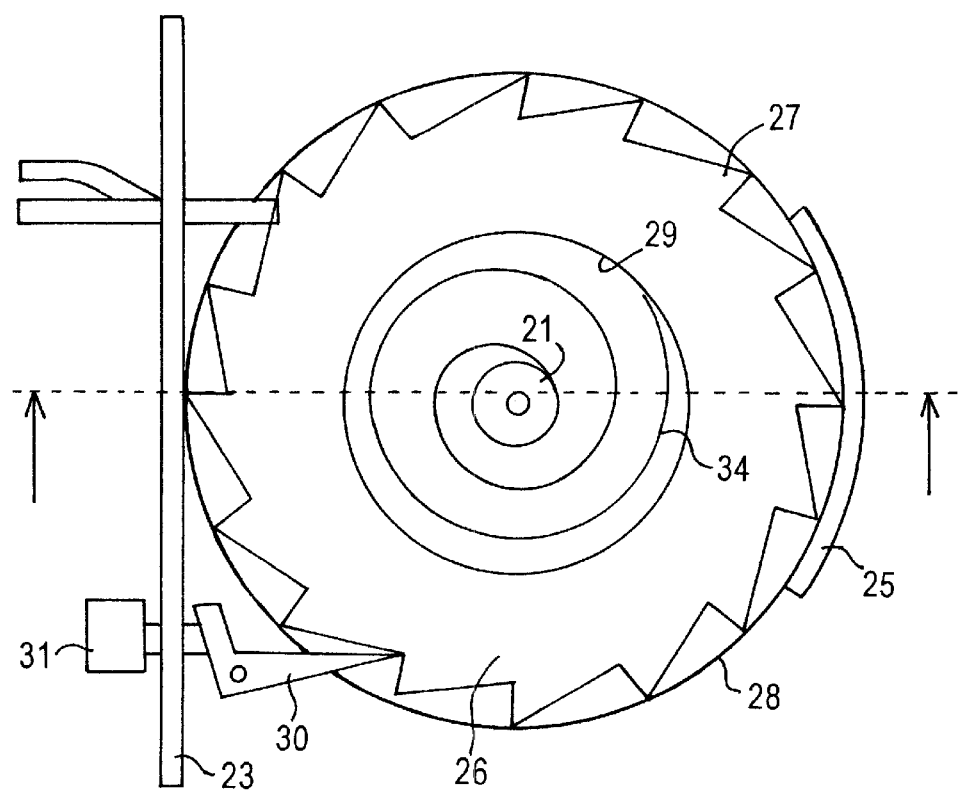
FIG. 11 is a plan view of the device in FIG. 10 with its spring cover removed.

Referring to FIGS. 10 and 11, a fixed spindle 21 projects from a chassis member 22. The chassis member 22 projects perpendicularly from a first case member 23 and lies parallel to a second case member 24. An arcuate wall 25 projects upwardly from the chassis member 22, defining together with the first case member 23, a space in which a rotatable spool 26 is located.

The spool 26 comprises parallel spaced first and second annular flanges 27, 28 connected by an open-ended cylindrical member 29. The spool 26 is coaxial with the spindle 21. The first flange 27 has a ratchet formed in its radially outer margin. A spring biased pawl 30 is located between the spool 26 and the first case member 23 and engages the ratchet on the spool 26. A push button 31 extends through the first case portion 23 and bears against the pawl 30. When the push button 31 is depressed, the pawl 30 is released from the ratchet.

A pair of flexible leads 32, 33 are wound around the spool 26. The proximal ends of the flexible leads 32, 33 are coupled to one end of a sprung lead 34 coiled within the spool 26. The other end of the sprung lead 34 is fixed to the spindle 21. The spindle 21 is provided with electrical contacts for providing electrical connections to signal carrying parts of the sprung lead 34.

A cover 35 is retained over the sprung lead 34 by a latch on the spindle 21.

It will be appreciated that the telescopic mount may be used with many different types of electronic apparatus, either as an integral part of that apparatus or as an add-on peripheral, with the provision of suitable software. Further possible enhancements include motorisation of the telescopic action.

What is claimed is:

1. Portable electronic apparatus comprising display means and a telescopic transducer mount comprising a plurality of sections, wherein the mount includes an audio transducer and is operable such that the position of the transducer is adjustable relative to the display means such that said display can be comfortably viewed by a user while said user is using said transducer, said apparatus further including a second audio transducer mounted to said telescopic transducer mount, wherein the first transducer is a microphone and the second transducer is an earphone, and wherein the microphone and earphone are located on separate sections of the mount, and wherein the distal section of the mount is divided into two separate limbs connected by hinge means, the microphone and earphone being located on respective ones of said limbs.

2. Portable electronic apparatus according to claim 1, including processing means configured to perform a program which makes use of the display means and the transducer for I/O functions.

3. Portable electronic apparatus according to claim 1, wherein the display means comprises a display mounted in a body.

4. Portable electronic apparatus according to claim 3, further including a microphone mounted to the body.

5. Portable electronic apparatus according to claim 3, wherein the mount folds into a recess in the body.

6. Portable electronic apparatus according claim 1, wherein the display means is configured to enable use of the apparatus as a videophone.

7. Portable electronic apparatus according to claim 1, comprising a combined hand-held personal computer and mobile telephone.

8. Apparatus according to claim 1, including a further transducer mounted to a further mount.

9. Apparatus according to claim 1 wherein the hinge means comprises a friction hinge.

10. Apparatus according to claim 1, wherein the extension and retraction of the mount is motorised.

* * * * *